United States Patent
Sinha et al.

(10) Patent No.: US 10,439,239 B2
(45) Date of Patent: Oct. 8, 2019

(54) SHUTDOWN METHOD OF FUEL CELL STACK AND FUEL CELL SYSTEM THEREFOR

(71) Applicants: GM Global Technology Operations LLC, Detroit, MI (US); Honda Motor Co., Ltd., Tokyo (JP)

(72) Inventors: Manish Sinha, Rochester Hills, MI (US); Michael Cartwright, Oxford, MI (US); Pinkhas A. Rapaport, Penfield, NY (US); Asao Uenodai, Saitama (JP)

(73) Assignees: GM Global Technology Operations LLC, Detroit, MI (US); Honda Motor Co., Ltd., Tokyo (JP)

( * ) Notice: Subject to any disclaimer, the term of this patent is extended or adjusted under 35 U.S.C. 154(b) by 682 days.

(21) Appl. No.: 14/742,785

(22) Filed: Jun. 18, 2015

(65) Prior Publication Data

US 2016/0372767 A1  Dec. 22, 2016

(51) Int. Cl.
*H01M 8/04223* (2016.01)
*H01M 8/04537* (2016.01)
(Continued)

(52) U.S. Cl.
CPC ..... *H01M 8/04231* (2013.01); *H01M 8/0438* (2013.01); *H01M 8/04223* (2013.01);
(Continued)

(58) Field of Classification Search
CPC ......... H01M 8/04231; H01M 8/04303; H01M 8/04679; H01M 8/04664; H01M 8/0438; H01M 8/04955; H01M 8/04223; H01M 8/04671; H01M 8/04228; H01M 2250/20; H01M 8/04559; Y02T 90/32
See application file for complete search history.

(56) References Cited

U.S. PATENT DOCUMENTS 6,127,057 A * 10/2000 Gorman ............ H01M 8/04223
                                                        429/429
8,195,407 B2    6/2012 Salvador et al.
(Continued)

FOREIGN PATENT DOCUMENTS

JP    2006092860 A    4/2006
JP    2006351241 A    12/2006
WO    WO 2014048526 A1 *  4/2014  .......... H01M 8/0662

*Primary Examiner* — Eugenia Wang
(74) *Attorney, Agent, or Firm* — Quinn IP Law

(57) ABSTRACT

A fuel cell stack, a method of operating a fuel cell stack and a fuel cell system. In one particular form, shutting down the stack upon detection of a leakage of fuel either within the stack or from the stack involves depressurizing and uniform consumption of hydrogen by catalytic consumption in the cathode of all cells. Upon consumption of oxygen in the cathode portion of the stack by chemical reaction, the remaining unreacted nitrogen from the air acts as an inerting fluid. After an indication of reaction cessation is established, at least some of the inerting fluid is conveyed from the cathode portion to the anode portion. One or more of a bleed valve, backpressure valve and bypass valve are manipulated to promote the anode portion depressurization, cathode portion inerting and subsequent conveyance of the inerting fluid to the stack anode portion.

20 Claims, 4 Drawing Sheets

(51) Int. Cl.
*H01M 8/04955* (2016.01)
*H01M 8/0438* (2016.01)
*H01M 8/04664* (2016.01)
*H01M 8/04303* (2016.01)

(52) U.S. Cl.
CPC ... *H01M 8/04303* (2016.02); *H01M 8/04559* (2013.01); *H01M 8/04664* (2013.01); *H01M 8/04679* (2013.01); *H01M 8/04955* (2013.01); *H01M 2250/20* (2013.01); *Y02T 90/32* (2013.01)

(56) References Cited

U.S. PATENT DOCUMENTS

| | | | | |
|---|---|---|---|---|
| 2005/0064252 A1* | 3/2005 | Kusakabe | ........ | H01M 8/04089 429/429 |
| 2005/0112428 A1* | 5/2005 | Freeman | ............ | B60L 11/1881 429/430 |
| 2005/0249987 A1* | 11/2005 | McLean | ........... | H01M 8/04089 429/458 |
| 2006/0251936 A1* | 11/2006 | Black | ............... | H01M 8/04201 429/443 |
| 2007/0202367 A1* | 8/2007 | Yoshida | ........... | H01M 8/04089 429/434 |
| 2009/0047555 A1* | 2/2009 | Sugawara | ........ | H01M 8/04089 429/410 |
| 2009/0104480 A1* | 4/2009 | Machuca | ......... | H01M 8/04089 429/429 |
| 2014/0120446 A1* | 5/2014 | Zhang | ............... | H01M 8/04753 429/444 |
| 2015/0228989 A1* | 8/2015 | Konrad | .............. | H01M 8/0662 429/427 |

* cited by examiner

SHUTDOWN METHOD OF FUEL CELL STACK AND FUEL CELL SYSTEM THEREFOR

The present disclosure relates generally to a method of operating a fuel cell stack and a fuel cell system therefor, and more particularly to such a fuel cell system and a method of shutting down the fuel cell stack when a large reactant leak has been detected.

BACKGROUND

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

One form of fuel cell component failure involves membrane thinning and eventual rupture, while another involves seal failure; both of these are common in stack end-of-life conditions. Such failure can lead to leakage in general, and in particular to the large and unintended transfer of $H_2$ from the anode portion, side or subsystem within the stack to either the cathode portion, side or subsystem, or overboard altogether. Of these, it is of particular concern when such leakage leads to a high $H_2$ concentration in the presence of air within the cathode portion of the cell or stack.

One remedial approach is to continue to run the stack normally, where the leakage flow is accounted for by introducing additional dilution air into the system. There are limits to the effectiveness of such an approach, especially for larger leakages, as the size of the leakage may exceed the capacity of the system to deliver full dilution air. Another presently-employed remedial action for such drastic failure is known as a "quick-stop", where the $H_2$ supply is cut off along with disengagement of the load (for example, an electric motor or the like) from the stack while leaving $H_2$ in anode. Typically, a significant shortcoming with the quick-stop approach is that it leaves the $H_2$ in the stack after a leak has been detected. Moreover, such an approach is only appropriate if the exhaust emissions exceed a certain threshold (for example, 8%) when full dilution air is accounted for. Although this approach may be good for many failure modes (such as reactant starvation) to prolong stack life, its effectiveness is severely curtailed after a large leak between the anode and cathode flowpaths has occurred. Significantly, most fuel cell systems operate such that the anode-side pressure of the stack is biased over that of the cathode side (often between roughly 1.5 psi (10 kPa) and 3 psi (20 kPa)); in such circumstances, a large leak would lead to significant $H_2$ flow into (and concomitant increased concentration of) a highly localized spot within the stack's $O_2$-containing cathode side. As such, to the extent that the quick-stop approach may be used in certain operational conditions, it is not suitable for shutting down an operating fuel cell system as a way to protect against the fuel (i.e., $H_2$) corruption of the air (i.e., $O_2$) side or subsystem after the formation of a large leak.

SUMMARY OF THE DISCLOSURE

According to one aspect of the present invention, a method of shutting down a fuel cell stack is disclosed to help get rid of excess $H_2$ in the fuel cell stack in the event a leak is detected. Within the present context, the stack is made up of numerous fuel cells each including anode and cathode portions with respective reactant-conveying flowpaths, as well as a proton-transmissive electrolyte disposed between the anode and the cathode portions. The method includes detecting a leakage within the stack, reducing pressure in the anode portion, manipulating one or more valves that are fluidly cooperative with their respective anode and cathode flowpaths in order to react the fuel and oxygen source reactants together such that inerting of the cathode portion takes place with the residual unreacted fluid (i.e., nitrogen, $N_2$) from the oxygen source, after which the inerting fluid is conveyed to the anode portion. In the present context, any of these valves are deemed to be disposed in a respective flowpath when they are either (a) physically resident within the flowpath or (b) fluidly cooperative with the flowpath such that their opening or closing can be used to affect a change in fluid transport through the connected flowpath. The inventors are of the belief that consuming both reactants (as opposed to merely one) is superior in that failure to remove excess $H_2$ (even in small quantities, such as 0.2 mol) could still leave about 50 kJ of residual energy that could—if deposited locally via leakage—produce unacceptably high levels of cell temperature increases. In one form, the predetermined voltage is a threshold amount necessary to provide electric current to one or more parasitic loads that derive their power from the current generated within the stack.

According to another aspect of the present invention, a method of shutting down an operating fuel cell stack upon detection of a reactant leak is disclosed. The method includes configuring the stack to have numerous fuel cells each with an anode portion defining an anode and an anode flowpath cooperative with a first reactant source, a cathode portion defining a cathode and a cathode flowpath cooperative with a second reactant source, and a proton-transmissive electrolyte disposed between the anode portion and the cathode portion. A controller cooperates with the stack to provide flow manipulation within the stack so that once a leak is detected, the controller receives one or more signals that correspond to the leakage detection so that it can reduce pressure in the anode portion by shutting off a supply of the first reactant to the anode, manipulate a first valve that is fluidly disposed in the anode flowpath and second valve that is fluidly disposed in the cathode flowpath, after which it can increase concentration of an inerting fluid in the cathode flowpath by further manipulating one or both of the first and second valves in order to promote consumption of at least a portion of the first and second reactants within the cathode portion until at least one of a (a) terminal voltage or (b) an anode portion pressure is below a predetermined level. This in turn allows at least a portion of the inerting fluid to be conveyed from the cathode portion to the anode portion.

According to another aspect of the present invention, a fuel cell system made up of a fuel cell stack, numerous flow control valves, at least one load and a controller cooperative with at least one of the stack, flow control valves and load such that it provides shutdown instructions in response to a leakage condition identified in the stack. The controller is configured to receive data corresponding to indicia of the leakage condition, as well as to manipulate operation of one or more of the valves, load and stack to depressurize at least some of the anode portion of the stack, deplete the presence of at least one of the $H_2$ and $O_2$ reactants within at least some of the cathode portion of the stack such that the concentration of the residual, unreacted $N_2$ increases to cause cessation of further reactive activity in the cathode portion, after which the $N_2$ that is left over from the depletion of the $H_2$ and $O_2$ reactants at the cathode portion may be used to substantially backfill at least some of the anode portion.

According to yet another aspect of the present invention, a fuel cell system includes controller configured to shut down one or more operating fuel cell stacks when it detects a large abrupt leak between the stack's anode and cathode flowpaths; as discussed elsewhere, such control may involve sending signals to other components of a fuel cell system in order to sequentially (a) reduce pressure in at least a portion of the anode, (b) use the inerting fluid that is left over from the chemical reaction of the two reactants in the cathode to substantially cease any further electrochemical activity in the cathode and (c) fill at least a portion of the anode with at least some of the inerting fluid.

BRIEF DESCRIPTION OF THE FIGURES

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE PREFERRED EMBODIMENTS

Figure 1A:
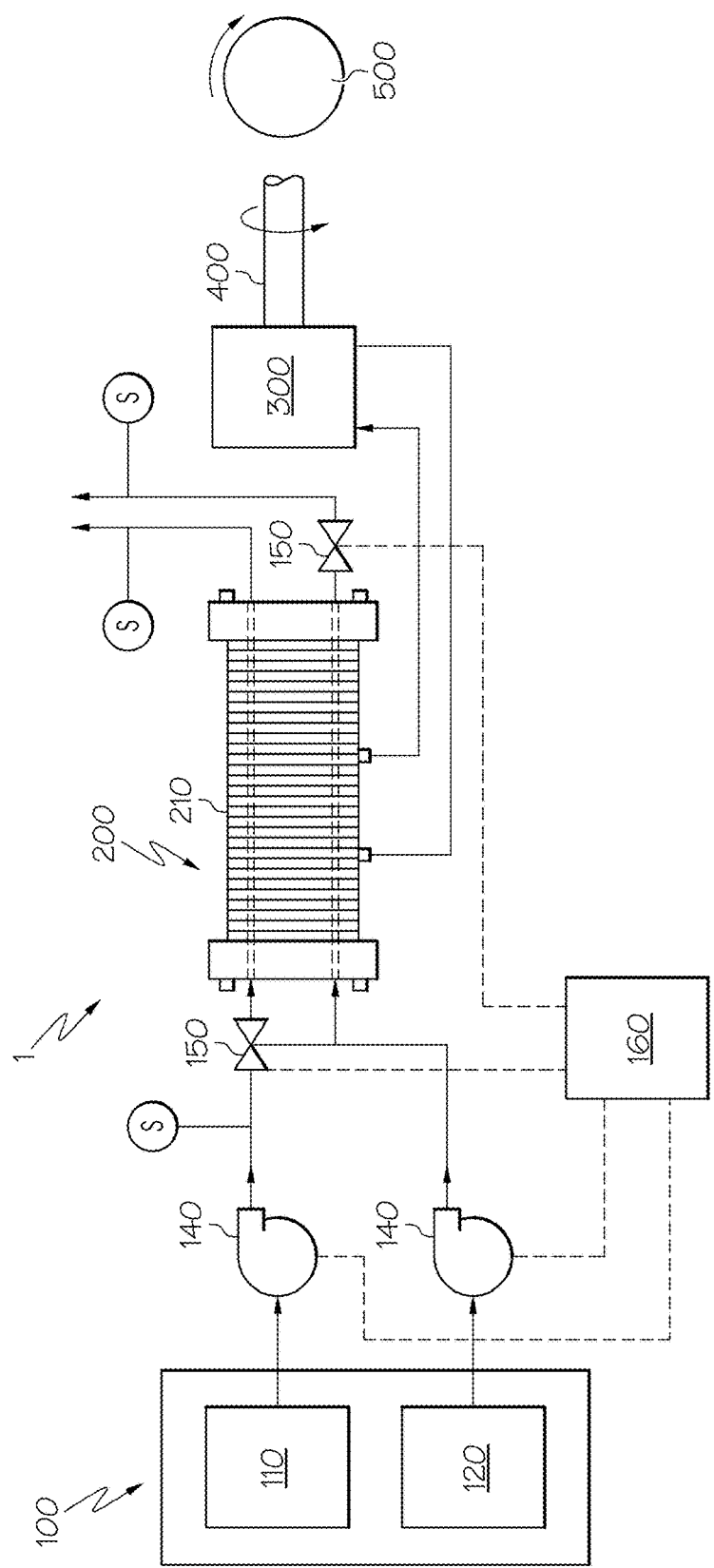
FIG. 1A shows a block diagram of a fuel cell system configured for vehicular application.
Figure 1B:
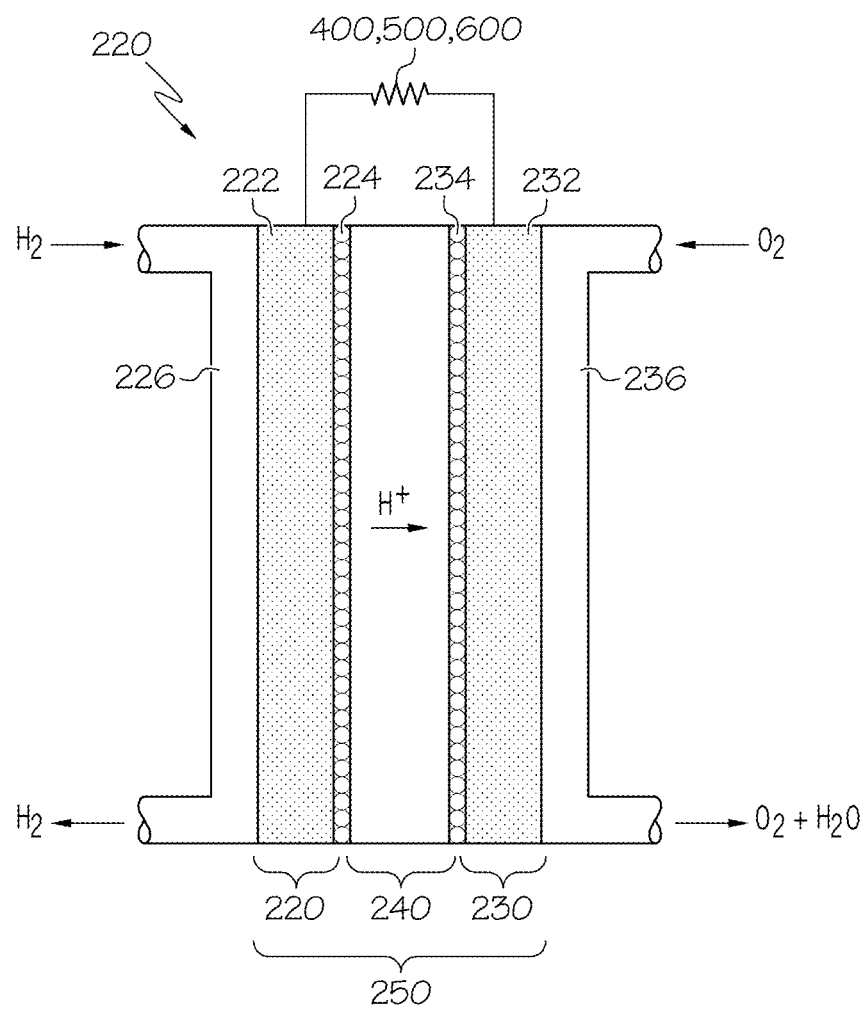
FIG. 1B shows a vertical sectional view of a simplified representative fuel cell from the system of FIG. 1A.

Referring first to FIGS. 1A and 1B, a block diagram of a notional fuel cell system (FIG. 1A), as well as an individual fuel cell (FIG. 1B) are shown. Mobile fuel cell system 1—which may be operated in a manner consistent with the embodiments of the present invention—includes a reactant delivery system 100 (made up of a fuel (i.e., first reactant) source 110 (such as a hydrogen tank) and an oxygen (i.e., second reactant) source 120 (which in one preferred form is ambient air), fuel cell stack 200 and a load in the form of an electric battery or motor 300, drivetrain 400 and one or more motive devices 500, the last shown notionally as a wheel. In configurations where the load 300 is a motor, it is used to convert the electric current coming from the stack 200 into mechanical power such as rotating shaft power that can be used to operate the drivetrain 400 and wheels 500 in a manner known to those skilled in the art. An additional load 600, shown with particularity in FIG. 1B, may be in the form of a stack discharge resistor as discussed in more detail below. Within stack 200, numerous individual fuel cells 210 are shown serially connected. As can be seen, the delivery of the reactants—as well as that of ancillary fluids, such as those used for cooling or other heat transfer—is preferably achieved by dedicated circuits that include suitably-configured conduit 130, and corresponding pumps 140 and valves 150. As will be appreciated by those skilled in the art, pumps 140 may be optional in configurations where the reactants being from their respective source are already in pressurized form, and that either variant is within the scope of the present invention. Although not shown, other fuel delivery and fuel processing systems are available for use with system 1. For example, there could be, in addition to a fuel source 110 and oxygen source 120, a water source (not shown) that could be used for (among other things) stack 200 cooling.

The electrical current being generated by the fuel cells 210 of the stack 200 may be used to provide power the pumps 140 and related equipment, as well as for creature comfort apparatus (such as air conditioners, heaters, window defrosters, powered seats) or the like. Furthermore, while the present system 1 is shown for mobile (such as vehicular) applications, it will be appreciated by those skilled in the art that the use of the fuel cells 210, their respective stacks 200 and the ancillary equipment is equally applicable to stationary applications. In the present context, the stack ancillary equipment is that used to provide balance of plant (BOP) operation, and may include the parasitic devices discussed herein, as well as other components that derive their source of electric current from the stack 200. In one part of shutting down the stack 200 in a manner consistent with the present disclosure, the electric current supplied by the stack 200 is preferably reduced to a level that substantially coincides with an amount needed to operate such ancillary equipment.

Methods and systems in accordance with the invention may be performed by a computer-based controller 160 (also referred to as a programmable control device or control unit) that is capable of executing instructions organized into one or more program modules that are made up of dedicated hardware devices and corresponding software. Instructions for implementing any of the system 1 manipulation functions in accordance with the invention (such as opening or closing valves, turning pumps or compressors on or off (as well as speeding them up or down) and conveying sensed data and diagnostic function information) may be tangibly embodied in any suitably-configured embodiments of the various devices or components that make up the controller 160, including being placed resident on a memory portion thereof. Referring with particularity to FIG. 1A, the connections depicted between controller 160 and the various components that make up fuel cell system 1 indicates that there operation can be made to change through instructions received from the controller 160.

In a preferred form, controller 160 is configured as automated data processing equipment, such as that associated with a digital computer. In such case, a preferred form includes one or more of an input, an output, a processing unit (often referred to as a central processing unit (CPU)) and memory that can temporarily or permanently store such a code, program or algorithm in the memory of the controller 160 such that the instructions contained in the code are operated upon by the processing unit based on input data such that output data generated by the code and the processing unit can be conveyed to another program or a user via output. As such, controller 160 becomes particularly-adapted in order to perform at least some of the data acquisition, manipulation or related computational functions needed to provide prompt, efficient shutdown of system 1 in the event that the appropriately triggering leakage condition is detected. It will be appreciated by those skilled in the art that computer-executable instructions that embody the calculations discussed elsewhere in this disclosure can be placed within an appropriate location (such as the aforementioned memory) within controller 160 in order to achieve the objectives set forth in the present invention.

In a particular form, the computer-readable program code that contains the algorithms and formulae needed to perform the sensing and controlling functions outlined above can be loaded into suitable portions of controller 160 memory. Such computer-readable program code may also be formed as part of an article of manufacture such that the instructions contained in the code are situated on a magnetically-readable or optically-readable disk or other related non-transitory, machine-readable medium, such as flash memory device, CDs, DVDs, EEPROMs, floppy disks or other such medium capable of storing machine-executable instructions and data structures. Such a medium is capable of being accessed by controller 160 or other electronic device having a processing unit used for interpreting instructions from the computer-readable program code. Together, the processor and any program code configured to be executed by the processor define a means to perform one or more of the control functions discussed herein. As will be understood by those skilled in the computer art, the controller 160 may include additional chipsets, as well as a bus and related wiring for conveying data and related information between its processing unit and other internal devices (such as the aforementioned input, output and memory devices) and external devices (such as the stack 200 and its ancillary equipment). Upon having the program code means loaded into ROM, the controller 160 of system 1 becomes a specific-purpose machine configured to determine proper shutdown sequences in the manner described herein.

As shown with particularity in FIG. 1B, details of each fuel cell 210 are shown. Cell 210 includes portions that correspond to electrodes, notably an anode 220, cathode 230 and an electrolyte layer 240 disposed between the electrodes. The respective hydrogen and oxygen channels 226, 236 that are used to convey the reactants into and out of cell 210 are also shown. In the present context, the term "portion" is used to describe either those parts of the entire fuel cell stack 200, or those of the individual cells 210 within the stack 200. As such, a leakage that takes place in the anode 220 portion of either the cell 210 or stack 200 is meant to cover those circumstances where the reactant being introduced into the anode 220 portion of the cell 210 or stack 200 escapes and is subsequently conveyed to a cathode 230 portion of the respective cell 210 or stack 200, and that the context will make it clear as to which of the individual cell 210 or entire stack 200 such leakage applies to. Regardless, either variant is deemed to be within the scope of the present invention.

The anode 220 includes an electrode substrate 222 and catalyst layer 224 that are fluidly exposed to the hydrogen channel 226. Likewise, the cathode 230 includes an electrode substrate 232 and catalyst layer 234 fluidly connected to the oxygen channel 236. Both of the channels 226, 236 form the part of an anode flowpath and cathode flowpath (both described below) that convey the appropriate reactants to and from their respective anode 220 and cathode 230 portions. Preferably, the electrode substrates 222, 232 are porous to allow diffusion of hydrogen and oxygen, as well as the flow of water that forms as a result of the fuel-oxygen reaction. The electrolyte layer 240, shown presently in the form of a proton exchange membrane, allows the ionized hydrogen to flow from the anode 220 to the cathode 230 while inhibiting the passage of electrical current therethrough.

During transient fuel cell operations, especially startup and shutdown (the latter of which will be discussed in more detail below), the presence of hydrogen-air interfaces and other conditions may lead to excess voltage potentials that can shorten the life of the catalyst layers 234; to prevent or minimize the impact of such condition, inerting and purging equipment (as discussed in more detail below) may be included in system 1. Voltage levels (also referred to herein as terminal voltage) that would indicate a substantial electrode inerting are preferably below 0.5 volts, and more preferably below 0.4 volts.

Figure 2A:
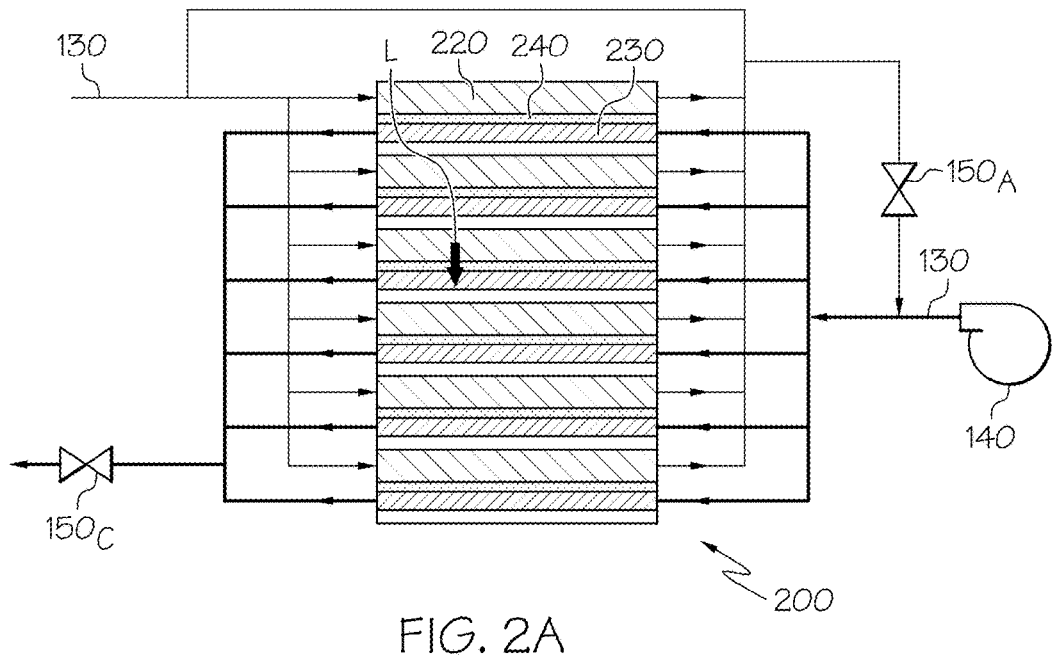
FIG. 2A shows a block circuit diagram illustrating a first embodiment of the placement of an anode-side bleed valve and a cathode-side backpressure valve that are used to help perform shutdown operations of the system of FIG. 1A.
Figure 2B:
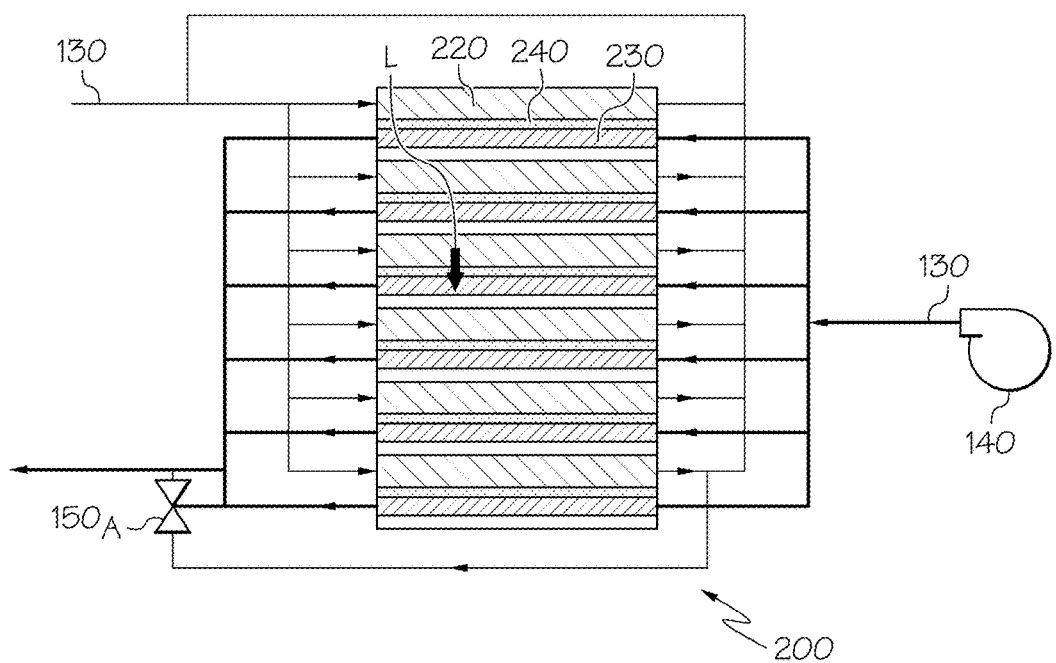
FIG. 2B shows an embodiment of the block circuit diagram of FIG. 2A in which the anode-side bleed valve is connected to a cathode-side outlet.

Referring next to FIGS. 2A and 2B, two block circuit diagrams show alternate embodiments of the anode and cathode flowpath interaction that takes place through the shutdown operations of the present invention on the system of FIG. 1A. Referring with particularity to FIG. 2A, placement of an anode bleed valve $150_A$ and a cathode backpressure valve $150_C$ (also called an exhaust valve) relative to the stack 200 and conduit 130 is shown. These two valves may be used to help the system 1 perform a shutdown operation in the event a leak L is detected, where backpressure valve $150_C$ is also used to discharge cathode reactants from stack 200. Additional valves (such as a bypass valve, not shown) may be used to introduce oxygen as a way to dilute the hydrogen left in the cathode 230 portion of stack 200 for catalytic heating to help reduce the emissions from the stack 200 during warm-up, as well as for volt suppression to facilitate load-syncing of stack 200. Other valves (such as a bypass valve, not shown) may also be included to facilitate improved operation of system 1.

In addition to detected hydrogen leakage, the input parameters upon which the cooperation of the bleed and backpressure valves $150_A$, $150_C$ depend may include various temperature, pressure and set point conditions. These and other parameters (such as those associated with enabling or disabling functions of controller 160) may be used by the controller 160 to vary the operation of system 1. Furthermore, although much of the control logic described herein is for control over the valves 150 (in general) and anode bleed valve $150_A$ and cathode backpressure valve $150_C$ (in particular), as well as their respective pumps 140, it will be appreciated by those skilled in the art that additional control logic may be employed to affect control during normal periods of stack 200 operation. Fuel cell system 1 further includes one or more sensors S that measure the characteristics of the gas within it; in one form, these sensors S may be in the form of gas (specifically, $H_2$) detection sensors that are placed in signal or fluid communication with the stack 200 to provide indicia of a large, abrupt leak within, as well as in signal communication with controller 160 in order to convey the corresponding leakage signal to the controller 160. In one form, such a sensor S may be placed in a suitable adjacent location to detect overboard leak from stack 200. It will be appreciated by those skilled in the art that these and other sensors S may provide input signals that can be acted upon by the algorithmic control strategy embodied within controller 160. For example, some of the sensors S may be used to determine whether suitable voltage levels are attained during the shutdown operation, as well as for normal operation of system 1. In another particular form, $H_2$ detection versions of sensors S may not be necessary, as instead the $H_2$ leakage or concentration may be modeled directly by the controller 160; exemplary forms of such a model-based way to acquire this leakage or concentration information may be found in U.S. Pat. No. 8,195,407 entitled ONLINE METHOD TO ESTIMATE HYDROGEN CONCENTRATION ESTIMATION IN FUEL CELL SYSTEMS AT SHUTDOWN AND STARTUP, and US Published Patent Application 2013/0089797 entitled ANODE PURGE AND DRAIN VALVE STRATEGY FOR FUEL CELL SYSTEM, both of which are owned by one of the Assignees of the present invention and incorporated by reference in their entirety herein. In such configurations, the use of sensors may be limited to one or more of pressure sensors and temperature sensors, both of which may be more robust in or around the stack 200 environment.

Referring next to FIGS. 2A and 2B in conjunction with FIG. 1B, a leakage L is considered large within the present context when it amounts to about 5 kW to 10 kW or more of $H_2$ flow. As such, to qualify as a "large" leak, extremely high levels of $H_2$ conveyance outside of the anode 220 portion (such as those associated with conventional cathode catalytic heating (CCH) of a given cell 210, where the anode bleed valve $150_A$ is sized to permit the passage of about 60 kW $H_2$ that can be consumed in a typical automotive-sized fuel cell system 1) need not be experienced, although the approach of the present invention is capable of performing shutdowns under such conditions. By contrast, fairly common leakages (such as those dictated by stack end-of-life conditions from an efficiency perspective) of less than about 1 kW of $H_2$ flow (which may correspond to about a 5 mA/cm$^2$ in current generation reduction) of a comparably-sized fuel cell system 1 are considered small.

Figure 3A:
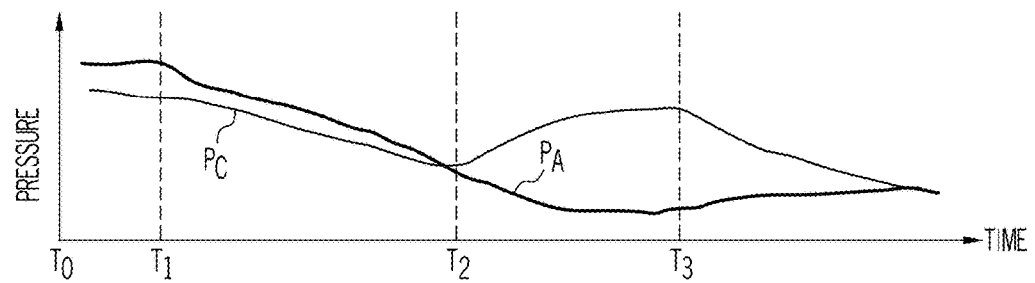
FIG. 3A shows a detail view of a notional pressure timeline that takes place by using the leakage shutdown strategy of the present invention.
Figure 3B:
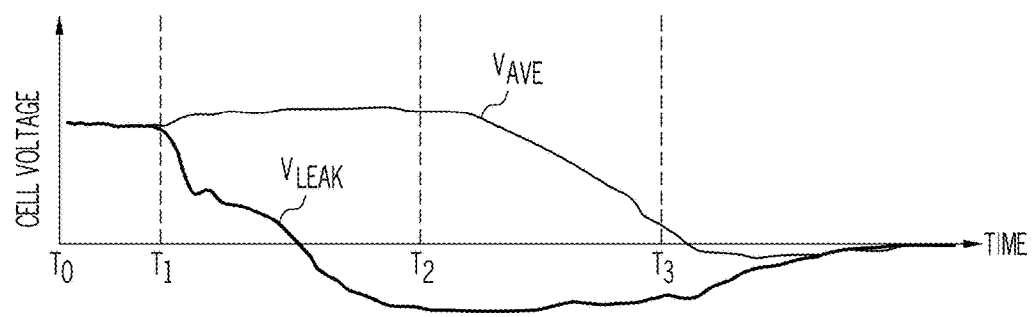
FIG. 3B shows a detail view of a notional voltage timeline that takes place by using the leakage shutdown strategy of the present invention.

Referring next to FIGS. 3A and 3B, a timeline of shutdown events for fuel cell stack 200—as well as the shutdown impacts on pressure (FIG. 3A) and voltage (FIG. 3B) are shown. In particular, the operation of the fuel cell stack 200 proceeds until such time as leakage L is detected at time $T_1$. While the form of leakage detection is not critical to the present invention, one suitable form may be through a hydrogen gas sensor S (such as that depicted in FIG. 1A) that may be placed in cooperation with the anode or cathode flowpath. The stack 200 is assumed to be under load 300 (for example, coupled to an electric motor or other part of an automotive drive train), while the pressure in the anode 220 portion is biased higher than that of the cathode 230 portion within each cell 210 of stack 200. By way of example, a low pressure setting for a notional automotive fuel cell stack 200 may have the pressure setting within the cathode 230 portion be about 110 kPa and that of the anode 220 portion be about 130 kPa, while that at peak power may be about 220 kPa and 240 kPa, respectively. With such normal operating conditions of the fuel cell stack 200 as a backdrop, the shutdown of the stack 200 according to a method and a system of the present invention may involve three general steps upon detection of a large leak, including (1) depressurization of the anode 220 portion that corresponds to times $T_1$ to $T_2$, (2) an increase in the relative concentration of inerting fluid (typically nitrogen ($N_2$)) that corresponds to times $T_2$ to $T_3$ as a result of the consumption of the oxygen by the chemical reaction of it with the hydrogen that is being rerouted or bled into the cathode 230 portion and (3) introducing the inerting fluid into the anode 220 portion that corresponds to times $T_3$ onward. These steps are discussed in more detail as follows.

Referring to timeline period between $T_0$ (where the stack 200 is operating under a maximum power condition) and $T_1$ (where a large, abrupt leakage L is detected), the anode portion pressure $P_A$ exceeds that of the cathode portion $P_C$. In response to detection of the leakage L (such as by one or more of the sensors S) at time $T_1$, controller 160 commences operation of the first step by cutting off the supply of the first reactant (i.e., fuel in the form of $H_2$ or the like) from the source 110 in order to cease reactant delivery to the stack 200; during this time, pressure control of the anode 220 portion is kept on. Soon thereafter (as evidenced by the period extending from time $T_1$ to time $T_2$), the pressure in the anode 220 portion starts to drop, initially faster than that of the cathode 230 portion. As mentioned above, anode pressure is preferably controlled by an $H_2$ injector or a suitably-configured pump 140. The power drawn (for example, about 0.1 A/cm$^2$ (which is the equivalent of about 10 kW)) from the stack 200 should be reduced, preferably to a value equivalent to that of the load on the stack 200. Sensors S may be included to deliver signals that correspond to the amount of power drawn, and may further communicate with controller 160 to help keep such equivalence. As mentioned elsewhere in the present disclosure, such load may be in the form of the auxiliary equipment (which may include the various parasitic loads discussed herein, as well as others). In situations where the load (such as from a traction motor or the like) demand is low, system 1 parasitic components—such as one or more compressors, pumps, batteries, resistive heaters, air conditioners or the like—may be used to help consume the excess electrical power still being generated. In one form, it may be beneficial to operate stack 200 at a higher cathode 230 portion stoichiometry in order to keep emissions low; this may be particularly beneficial in situations where the anode-to-cathode leak happens to be near the cathode 230 portion outlet and there is limited active area to consume the $H_2$. High flow in the cathode 230 portion will also result in increased compressor power and faster consumption of the $H_2$ in the anode 220 portion. Coolant flow (which may be provided by suitably-equipped pumps, conduit, valves and control circuitry, none of which are shown) for the stack 200 should be increased to a maximum flow; this will help with cooling any locally-generated reaction hotspot, as well as provide another of the parasitic loads mentioned above that may be used to expedite $H_2$ consumption.

As part of the first of the three general steps mentioned above, to depressurize the anode 220 portion, anode bleed valve $150_A$ is opened. As shown in FIG. 2A, the size of the conduit and related equipment is such that the path of least resistance for the flow of $H_2$ may be through the bleed valve $150_A$ rather than through the leak location L. Furthermore (at least with the embodiment depicted in FIG. 2A), $H_2$ exiting the anode bleed valve $150_A$ will mix in an inlet manifold or header that is part of conduit 130 that is used to feed the cathode 230 portion of each of the individual cells 210 so that the $H_2$ is relatively equally distributed in all of the cells 210 for consumption in a manner similar to the CCH mentioned above. The cathode 230 portion valves (including back pressure valve 150$_C$ and any bypass valves, not shown) may also be manipulated to control the anode 220 portion pressure P$_A$ to enable it to decrease while still maintaining a small anode 220 portion pressure bias (for example, between about 5 and 10 kPa) relative to the cathode 230 portion pressure P$_C$. This step may be completed when the anode 220 portion pressure P$_A$ is close to the ambient (i.e., roughly 14.7 lb/in$^2$ or 100 kPa) pressure. During this step, the voltage V$_{LEAK}$ of the compromised cell drops rapidly, although the average stack voltage V$_{AVE}$ remains relatively unaffected.

Regarding the second step, starting at time T$_2$, the catalytic reaction of H$_2$ and O$_2$ acts to increase the relative concentration of the nitrogen present in the ambient air supply in the cathode 230 portion. During this step, the local increase in the concentration of inerting fluid i.e., N$_2$) is useful in the manner discussed in the next step. During this second step, it is important to close the anode bleed valve 150$_A$ in order to isolate the anode and cathode 220, 230 portions from one another. Moreover, it is important to maintain the load on the stack 200 and keep consuming reactants (both H$_2$ and O$_2$) until the stack 200 terminal voltage falls to zero or substantially zero, thereby indicating that most of the H$_2$ is consumed. Thus, as the H$_2$ is consumed, power output from stack 200 will gently reduce to zero or substantially zero; this is in contrast to the aforementioned "quick stop" remedial approach where the power is disengaged abruptly. In order to ensure that as much O$_2$ as possible is depleted in the cathode 230 portion, the back pressure valve 150$_C$ is closed; this additionally helps to build up the cathode 230 portion pressure in a manner similar to O$_2$ depletion that takes place during normal shutdown. In addition, average stack voltage V$_{AVE}$ starts to drop, but has yet to catch up with the drop in the voltage V$_{LEAK}$ of the leaking (or compromised) cell. This step may be completed when the average stack voltage V$_{AVE}$ is below a predetermined threshold; in one form, this threshold is the voltage level where the stack 200 is no longer capable of driving any of the parasitic loads. In another form, this step may be completed when the anode portion pressure P$_A$ is below ambient. In one form, the backpressure valve 150$_C$ may be manipulated into a slightly open position to reduce cathode portion pressure P$_C$ as a way to maintain the low anode portion pressure P$_A$ bias mentioned above; such manipulating may be done until the anode 220 portion pressure P$_A$ decays due to consumption to a suitably low level (such as at or below ambient). As can be seen in the voltage trace of FIG. 3B, there may be periods where the voltage V$_{LEAK}$ of the leaking/compromised cell may go negative. While this can be expected to contribute to carbon corrosion in the leaking/compromised cell, the inventors maintain that this is not problematic in that the cell—by virtue of having developed a leak L—is in need of being replaced anyway. As mentioned above, if the load from ETS is not available, system 1 may be operated through the controller 160 to use one or more of the readily-available forms of parasitic loads (such as the aforementioned pumps, compressors or other on-board equipment).

Starting at time T$_3$, the third step of backfilling or increasing the inerting fluid (N$_2$) in the anode 220 portion commences; in this step, once the anode portion pressure P$_A$ is less than or equal to the ambient pressure, operation of the pumps 140 or related compressors are stopped so that no more reactant is delivered to the stack 200. In this case, while the backpressure valve 150$_C$ remains closed, the bleed valve 150$_A$ is opened to convey N$_2$-rich air from the cathode 230 portion to the anode 220 portion through the header that is part of conduit 130 and bleed valve 150$_A$ in order to backfill or increase the inerting fluid (N$_2$) into the anode 220 portion. During this time, the stack voltage discharge resistor 600 is engaged to consume any remaining air and H$_2$ in the stack 200. Significantly, by filling the anode 220 portion with the inerting fluid (N$_2$), the heat generation in the stack 200 due to a local reaction is avoided. In an alternate form, once the anode pressure P$_A$ is less than or equal to the ambient pressure, the compressor (which in one embodiment acts like pump 140 from FIG. 1) is turned off while the bleed valve 150$_A$ is opened to push N$_2$-rich air to the anode 220 portion to dilute any H$_2$ remaining in the stack 200.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A method of shutting down a fuel-cell stack during operation, the method comprising:
    detecting a leakage condition within the fuel-cell stack, the fuel-cell stack including a plurality of fuel cells, each fuel cell comprising:
        a first portion defining an anode and an anode flowpath coupled to a first source, the first source containing a first reactant,
        a second portion defining a cathode and a cathode flowpath coupled to a second source, the second source containing a second reactant, and
        a proton-transmissive electrolyte disposed between the first portion and the second portion;
    in response to the detecting the leakage condition, reducing pressure in the first portions by shutting off a supply of the first reactant to the anodes, the reducing including manipulating at least one of a first valve and a second valve, the first valve being fluidly disposed in the anode flowpaths and the second valve being fluidly disposed in the cathode flowpaths;
    increasing a concentration of an inerting fluid in the cathode flowpaths by manipulating at least one of the first valve and the second valve to promote consumption of at least a portion of the first reactant and the second reactant within the second portions until at least one of a terminal voltage and a first-portion pressure associated with the detected leakage condition is below a respective predetermined level; and conveying at least a portion of the inerting fluid from the second portions to the first portions.

2. The method of claim 1, wherein the first valve includes a bleed valve and the second valve includes a backpressure valve.

3. The method of claim 2, wherein the backpressure valve is closed an amount sufficient to maintain a pressure bias between the first portions and the second portions.

4. The method of claim 3, further comprising manipulating at least one of the backpressure valve and a bypass valve an amount sufficient to maintain the pressure bias.

5. The method of claim 4, wherein the pressure bias is between 5 kPa and 10 kPa.

6. The method of claim 1, wherein the conveying the at least a portion of the inerting fluid from the second portions to the first portions occurs in response to the first-portion pressure being equal to ambient environment temperature.

7. The method of claim 1, wherein the reducing pressure in the first portions ceases when the first-portion pressure is equal to ambient environment pressure, and wherein the conveying the at least a portion of the inerting fluid from the second portions to the first portions occurs in response to the first-portion pressure being equal to ambient environment temperature.

8. The method of claim 1, wherein the concentration of the inerting fluid is increased until the terminal voltage is below the respective predetermined level, and the predetermined level of the terminal voltage is 0 volts.

9. The method of claim 1, wherein the predetermined level of the first-portion pressure is an ambient environment pressure.

10. The method of claim 1, further comprising closing the first valve and the second valve.

11. The method of claim 10, further comprising having pressures within the second portions exceed the first-portion pressure associated with the detected leakage condition upon attaining the predetermined level of the terminal voltage.

12. The method of claim 10, wherein the step of conveying at least a portion of the inerting fluid includes, after the increasing the concentration of the inerting fluid, opening the first valve to a open position while keeping the second valve closed.

13. The method of claim 1, wherein increase of the concentration of the inerting fluid ceases when a predetermined condition occurs, the predetermined condition being at least one of the first-portion pressure being below an ambient environment pressure and a voltage of the fuel-cell stack being below an amount needed to drive a parasitic load.

14. The method of claim 1, further comprising increasing, in response to the detecting the leakage condition, an amount of parasitic load on the fuel-cell stack during reducing pressure in the first portions.

15. The method of claim 14, wherein increasing the amount of the parasitic load comprises increasing flow of a coolant through the fuel-cell stack via a coolant delivery mechanism.

16. The method according to claim 1, further comprising raising, in response to detecting the leakage condition, stoichiometry of the cathodes including increasing flow of the second reactant.

17. The method according to claim 1, wherein the reducing pressure in the first portions further includes reducing electric current supplied by the fuel-cell stack to a level that coincides with an amount needed to operate stack ancillary equipment.

18. The method according to claim 1, wherein the detecting is performed with at least one gas-detection sensor that is placed in fluid communication with the fuel-cell stack, while at least one of the reducing, the increasing, and the conveying is performed at least in part by a controller that is in signal communication with the gas-detection sensor.

19. The method according to claim 1, wherein the detecting, the reducing, the increasing, and the conveying are performed at least in part by a controller that is in signal communication with the fuel-cell stack through at least one pressure sensor and at least one temperature sensor and without input from a gas-detection sensor.

20. A method of shutting down a fuel-cell stack upon a detection of a leakage condition therein during operation, the method comprising:
providing a plurality of fuel cells, an anode flowpath, and a cathode flowpath within the fuel-cell stack, each of the plurality of fuel cells including:
a first portion including an anode,
a second portion including a cathode, and
a proton-transmissive electrolyte disposed between the first portion and the second portion;
providing a first valve fluidly disposed in the anode flowpath and a second valve fluidly disposed in the cathode flowpath; and
using a controller coupled to the fuel-cell stack, the controller being configured to:
receive at least one signal corresponding to the detection of the leakage condition,
manipulate at least one of the first valve and the second valve to reduce pressure in the first portions, thereby causing a shut-off of a supply of a first reactant to the anodes,
manipulate at least one of the first valve and the second valve to promote consumption of the first reactant and a second reactant within the fuel-cell stack, and
after at least one of a terminal voltage and a first-portion pressure associated with the detected leakage condition is below a respective predetermined level, convey at least a portion of an inerting fluid from the second portions to the first portions,
wherein the anode flowpath fluidly couples the anodes to a first-reactant source containing the first reactant, and wherein the cathode flowpath fluidly couples the cathodes to a second-reactant source containing the second reactant.

* * * * *